United States Patent [19]

Hatchett et al.

[11] 4,167,269
[45] Sep. 11, 1979

[54] FLEXIBLE RECORD DISK SIGNAL STORAGE APPARATUS

[75] Inventors: Michael R. Hatchett, Romsey; Leonard J. Rigbey, Winchester, both of England

[73] Assignee: International Business Machines Corporation, Armonk, N.Y.

[21] Appl. No.: 847,376

[22] Filed: Oct. 31, 1977

Related U.S. Application Data

[63] Continuation of Ser. No. 775,233, Mar. 7, 1977, abandoned.

[30] Foreign Application Priority Data

Sep. 30, 1976 [GB] United Kingdom ................... 405/76

[51] Int. Cl.² .............................................. G11B 3/60
[52] U.S. Cl. .................................... 274/39 A; 358/128
[58] Field of Search ................ 274/23 A, 39 R, 39 A; 358/128; 179/100.3 V; 360/99, 102

[56] References Cited

U.S. PATENT DOCUMENTS

| 3,369,227 | 2/1968 | Boissevain | 274/39 A |
|---|---|---|---|
| 3,603,742 | 9/1971 | Schuller | 360/102 |
| 3,830,506 | 8/1974 | Ewert et al. | 274/39 A |
| 3,842,197 | 10/1974 | Broussaud et al. | 360/102 X |
| 3,980,810 | 9/1976 | Tiret | 360/102 X |
| 4,003,091 | 1/1977 | Wright | 360/102 |

OTHER PUBLICATIONS

"The Dev. of the Flexible Disk Magnetic Recorder", Proceedings of the Ire, Jan. 1961, p. 171, FIGS. 14–16.

*Primary Examiner*—Charles E. Phillips
*Attorney, Agent, or Firm*—Herbert F. Somermeyer

[57] ABSTRACT

Flexible disk record storage apparatus has a chordally perturbed backing plate for inducing a dynamic stiffness in a flexible recording disk rotating immediately adjacent the plate. A head radially movably disposed between the chordal perturbations provides reliable recording and playback. A web portion of the backing plate has a predetermined flatness circumscribing a transducing location for enhancing recording and playback quality.

31 Claims, 9 Drawing Figures

4,167,269

FLEXIBLE RECORD DISK SIGNAL STORAGE APPARATUS

This is a continuation of application Ser. No. 775,233 filed Mar. 7, 1977 now abandoned.

BACKGROUND OF THE INVENTION

The invention relates to data storage apparatus of the kind in which a flexible record disk is mounted for rotation over a stationary rigid backing plate and in particular to the configuration of the backing plate for use in such apparatus.

Data storage apparatus in which a flexible record disk is rotated over and in close proximity to, a flat stationary backing plate at such a speed that an air bearing is created between the disk and the backing plate is known. The presence of such a backing plate is supposed to exert a stabilizing influence on the rotating disk to enable data to be recorded on and played back from the disk by a recording/playback head. It has been found, however, that the introduction of a head into the plane of rotation of the rotating flexible disk disturbs the mechanical stability of the disk to such an extent that reliable recording and playback of data is not always possible.

SUMMARY OF THE INVENTION

In a single disk recorder, the record/playback head is passed through an elongated slot in the backing plate which is radially disposed with respect to the flexible disk to enable data to be recorded on and played back from the surface of the flexible disk facing the backing plate. It was found that the provision of the slot considerably disturbed the mechanical stability of the rotating disk, and introduction of the head through the slot increased the instability to an unacceptable level. In accordance with the invention for dynamically improving the mechanical stability of the disk at least in the vicinity of the head, a bend is imparted to the flexible disk by means of a backing plate having a particular configuration.

Apparatus employing the present invention is a data storage apparatus comprising a flexible record disk mounted for rotation over a rigid backing member or plate, the member consisting of a flat central or web portion and two side portions which together present a generally concave surface facing the disk. A longitudinal radially extending slot extends through the central or web portion to permit a transducing access of a record/playback head to the surface of the disk facing the member. The shape of the member and its position with respect to the disk is such that in operation the rotating disk is continuously bent about two chords, one chord on each side of a diametral line passing through the slot and the axis of rotation of the disk. The disk is supported on an air bearing generated between the disk and the backing member.

The foregoing and other objects, features, and advantages of the invention will be apparent from the following more particular description of preferred embodiments of the invention, as illustrated in the accompanying drawings.

DETAILED DESCRIPTION

Figure 1:
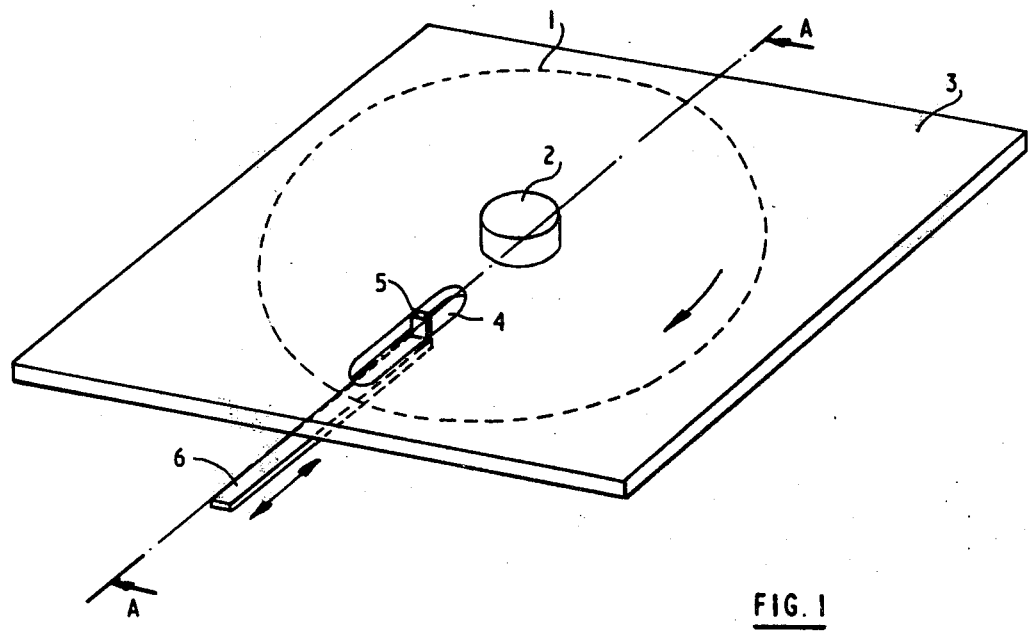
FIG. 1 is a perspective view of data storage apparatus employing a prior art flat backing plate.
Figure 2:
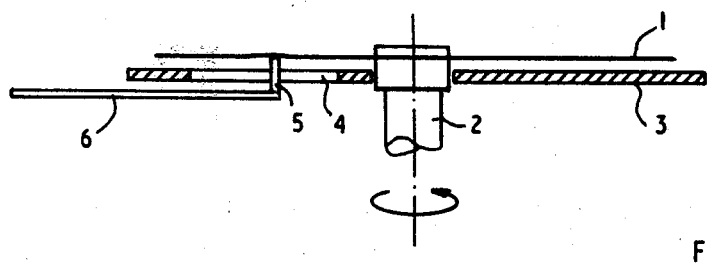
FIG. 2 is a sectional view along line A—A in FIG. 1.

The prior art data storage apparatus shown in FIG. 1 and FIG. 2 consists of a flexible record disk 1 (shown dotted in FIG. 1) mounted on a spindle 2 for rotation over and in close proximity to a flat rigid backing plate 3. A closed longitudinal slot 4 is provided through the backing plate 3 to enable a record/playback head 5 to record data on and play back data from the surface of the disk 1 facing the backing plate. A head support arm 6 is connected to an actuator mechanism (not shown) energisable to radially move the head in the slot in a radial direction with respect to the disk. During operation, the disk 1 is rotated at such a speed that an air bearing is created between it and the backing plate 3. The position of the head mounting arrangement is such that head 5 projects through the slot 4 and into the plane of rotation of the disk 1. The depth of penetration of the head 5 into the plane of rotation is chosen such that the record/playback gap of the head is sufficiently close to the disk surface to enable data record and playback operations to be performed on the disk. Without a certain degree of head penetration a relatively large spacing is produced between the head and the disk which prevents reliable recording and playback of data. Increase of head penetration has the desirable effect of reducing the thickness of the air bearing but also the undesirable effect of causing deformaton of the disk, known as "tenting", which contributes to mechanical instability.

In order to understand precisely why this instability occurs, a contour map of a flexible disk flying over a flat backing plate was produced used a height measuring microscope with a stroboscopic light source. The flexible disk used for this experiment was approximately 6 inches in diameter with a thickness of 1.5 mil. The disk was clamped on the disk spindle of 1.5 inches diameter 10 mil above the backing plate 3. The head 5 extended through the slot 4 to a distance of 16 mil above the surface of the backing plate 3. The rotational speed of the disk was 1500 rpm.

Figure 3:
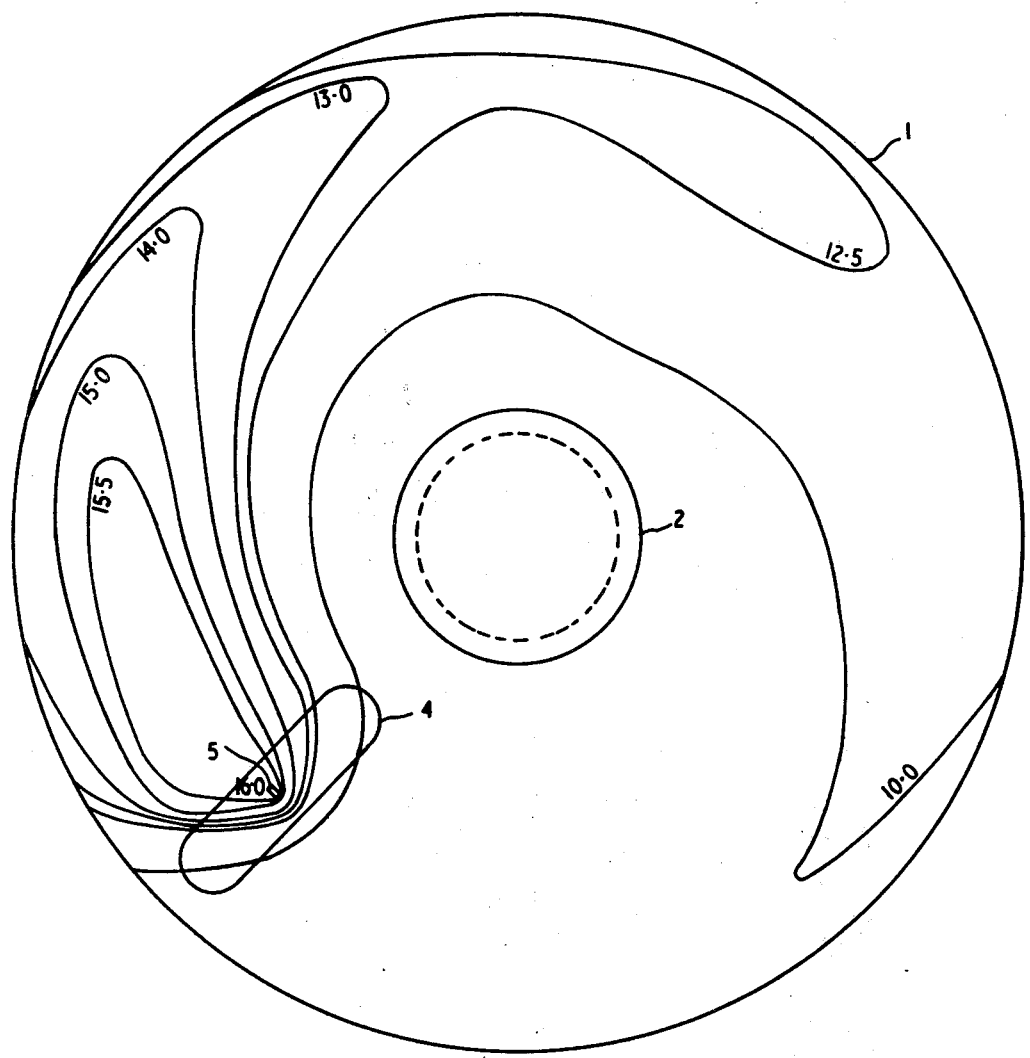
FIG. 3 is a typical contour map of the surface of a flexible disk in use in apparatus such as that shown in FIG. 1.

The resulting contour map is shown in FIG. 3 where disk heights above the backing plate are shown in mils. All reference numerals in this figure relate to the same components as in the previous figures. It can be seen from this contour map that the combined effect of the slot 4 in the backing plate 3 and the penetration of the head 5 into the plane of rotation of the disk 1 produces a "tenting" deformation which extends over a considerable area of the disk surface. Further, it will be observed that the edge of disk 1 is not rotating in a single plane but is subjected to quite large deflections which in practice are continually changing. This edge flutter is thought to contribute significantly to the mechanical instability of disk 1. Finally, it will be seen that the lift of disk 1 from the normal flying height of 10 mils upstream of head 5 to a height of 16 mils as it passes over head 5 occurs in a very short distance whereas downstream of head 5, disk 1 does not regain its normal flying height for about three quarters of a revolution. This means that the axial profile of disk 1 is not symmetrical over head 5 which results in the head 5 transducing gap (not shown) often being insufficiently close to the disk 5 surface for reliable recording and playback of signals.

The combination of the above listed operational parameters reduces the reliability of the apparatus to an unacceptable level. In accordance with the invention, stiffness is imparted to the disk, in the vicinity of head slot 4 by providing the later described bends in the backing plate 3. Several configurations were considered and rejected for one reason or another. For example, in one arrangement bends were made in the backing plate 3 so that the disk was located over a convex surface (not shown). It was found, however, that with the head accessing the underside of the disk through a slot in the plate 3, the resultant force generated by the head 3 penetrating the plane of rotation of the disk tended to push the disk 1 away from the backing plate 3. This force, aided by the centrifugal force which also acts to lift the disk away from a convex surface was sufficient to overcome the Bernoulli attractive force produced by the air flow between the disk 1 and the backing plate 3. The result was that the edges of the disk 1 separated from the plate 3 to such an extent that the desired stiffening of the disk 1 did not occur.

In accordance with yet another test the disk 1 was flown over backing plate 3 bent to provide a circularly or elliptically flying surface. A concave surface could theoretically be made by forming the backing plate with a part cylindrical cross-section. It was found, however, that this continuously curved backing plate imparted such stiffness to the disk that its edge was forced into contact with the backing plate at least at the upper parts of the curved sections. This arrangement was discarded as impractical and a different solution was sought. The solution of the present invention will now be described.

THE PREFERRED EMBODIMENT

Figure 4:
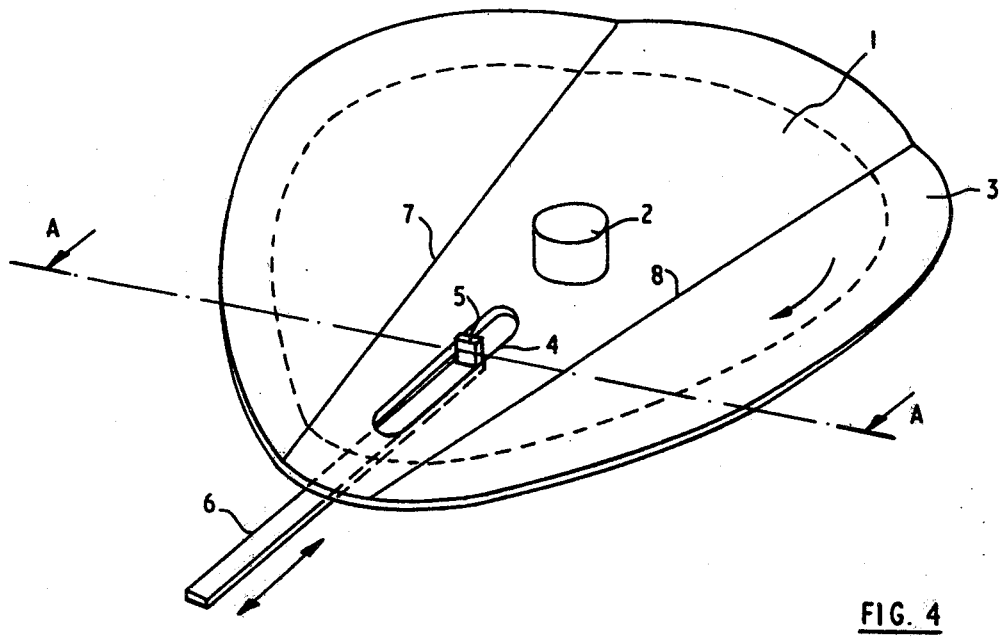
FIG. 4 is a perspective view of data storage apparatus employing a backing plate bent according to the invention.
Figure 5:
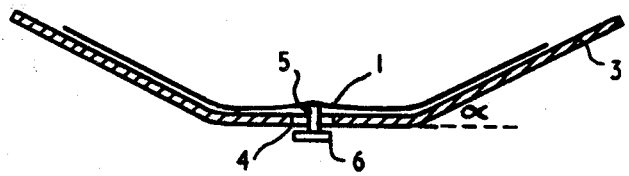
FIG. 5 is a sectional view along line A—A in FIG. 4.

FIGS. 4 and 5 show data storage apparatus incorporating a backing plate 3 bent to provide a concave flying surface. As before, the apparatus consists of a 6 inch flexible disk 1 (shown dotted in FIG. 4) mounted on a spindle 2 for rotation over and in close proximity to a rigid backing plate 3. A radially aligned longitudinal slot 4 is again provided through the backing plate 3 to permit access to the underside of the disk by a recording/playback head 5 mounted on a support arm 6. The backing plate 3 in this inventive apparatus, however, is bent towards the disk along two chordal lines 7 and 8 as to produce corresponding bends in the disk 1 along the two chordal lines 7 and 8. The bends 7, 8 result in a flat web portion therebetween which circumscribes the recording location represented by slot 4 and the hub on spindle 2. The bends 7 and 8 in the plate 3 are disposed one on each side of a diametral line (not shown) passing through slot 4 and the axis of rotation of the disk 1, viz., spindle 2. The disposition of the bends in the plate 3 appears not to be critical. Such bends may be parallel or nonparallel; may be symmetrically disposed with respect to slot 4 or asymmetrically disposed. The bends provide dynamic stiffness in a flat portion of flexible disk 1 in the vicinity of head slot 4 thereby limiting the extent of tenting produced by head 5 penetration which in the prior art contributed to mechanical instability of the disk 1.

Since it is important to maintain the head 5 gap (not shown) close to the disk to insure reliable recording and playback of signals, the tenting deformation of the disk around the head should preferably be symmetrical. That is, the axial contour lines in the vicinity of the head slot 4 should preferably be concentric circles with the head 4 gap located at the center. The bending of the disk 1 as described has this advantage as will be seen later with reference to FIGS. 6, 7 and 8.

In the preferred embodiment illustrated in FIGS. 4 snd 5, the bends in the backing plate 3 are disposed fairly close to the head slot 4. The optimum position is chosen with the bends sufficiently close to each other to limit the size of the tenting deformation to a small area but sufficiently far apart to still provide a substantially flat flying surface for the disk on each side of the slot between the bends. Such dynamically induced flat flying surface is desirable for faithful signal recording and reproduction. The size of the clamping disk hub at spindle 2, which again is 1.5 inches in diameter, imposes a limitation of the minimum distance between the bends in the vicinity of the spindle 2. The dimensions of the apparatus in the apparatus shown in FIGS. 4 and 5 are such that the chordal lines 7 and 8 about which plate is bent are nonparallel with the ends closest to the slot being spaced about one inch apart measured at the disk 1 periphery and the opposite ends spaced 3.5 inches apart also measured at the disk 1 periphery. Although many variations of backing plate 3 configurations exist which result in chordal disk stabilizing bends being produced in the flexible disk 1 the nonparallel bends described above have been selected as a preferred configuration. The bends should be such as to provide a flat or web portion circumscribing a transducing location for receiving a head from either the plate 3 as shown, or from above plate 3 (not shown) for transducing access in a flat area of disk 1.

Experiments were also conducted with bends in the backing plate at different angles $\alpha$ (FIG. 5). With the apparatus described above, it was found that satisfactory results were obtained with the angle $\alpha$ lying between 8° and 20° with best results with $\alpha = 14° \pm 4°$. It should be stressed, however, that the experiments were not exhaustive and it is to be expected that these figures will differ for other apparatus using disks exhibiting different physical characteristics.

Figure 6:
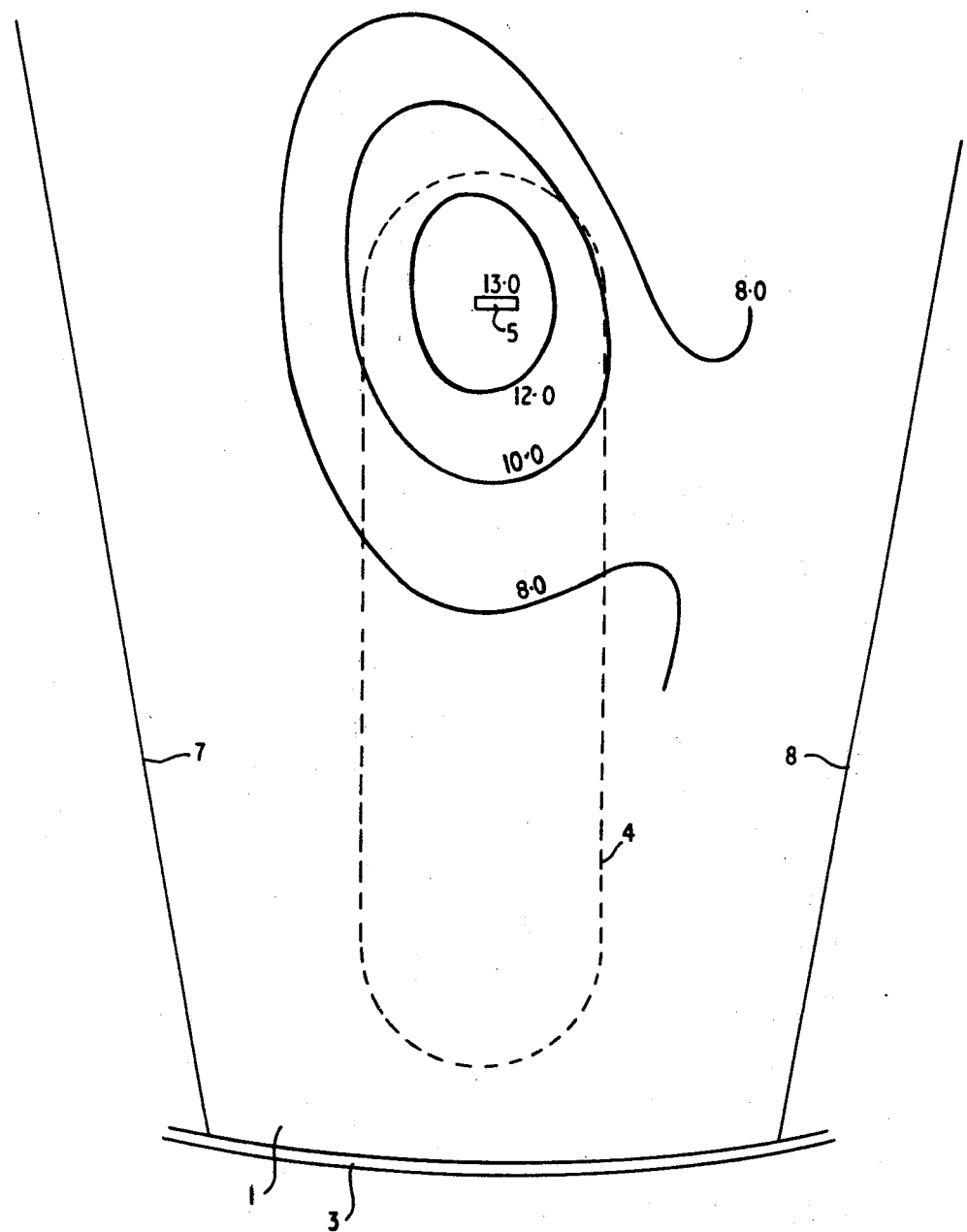
FIGS. 6, 7 and 8 are typical contour maps of the surface of a flexible disk in use in apparatus such as that shown in FIG. 4 for different head positions.
Figure 7:
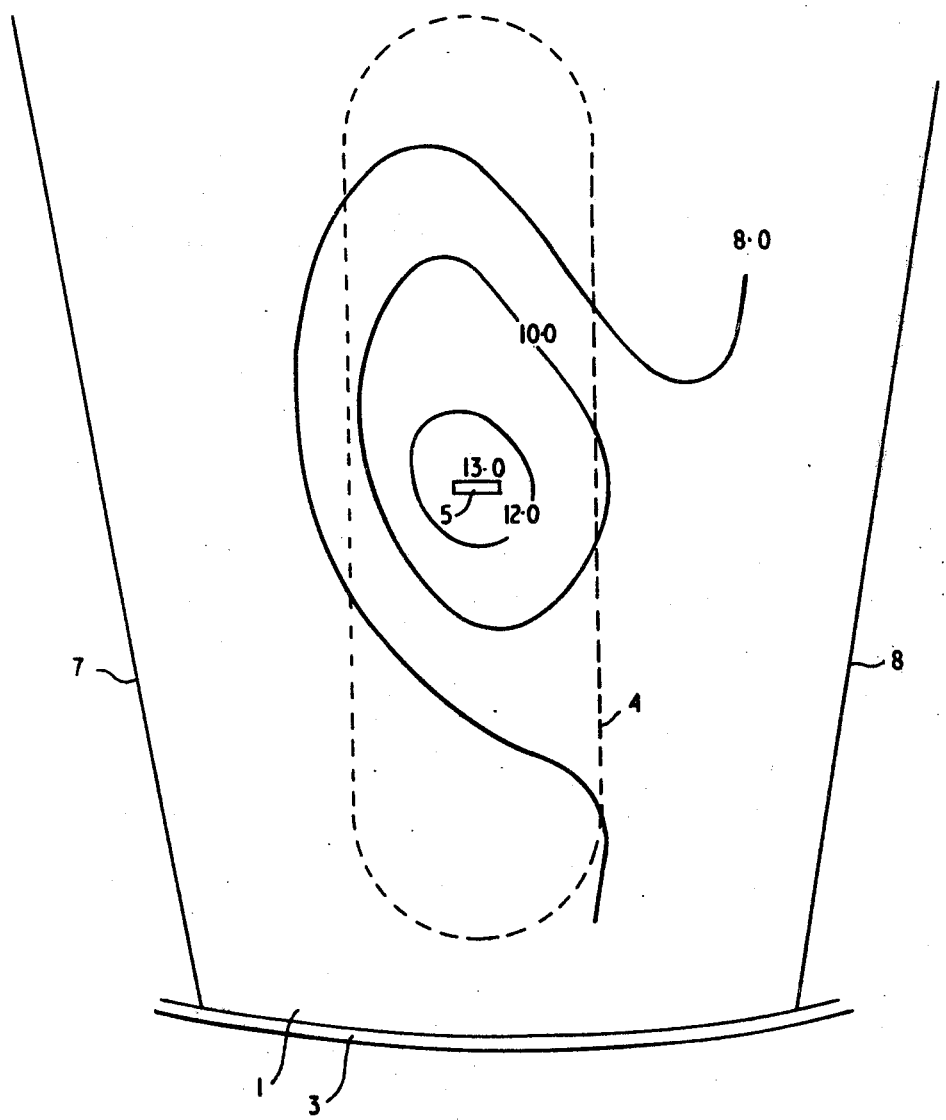
Figure 8:
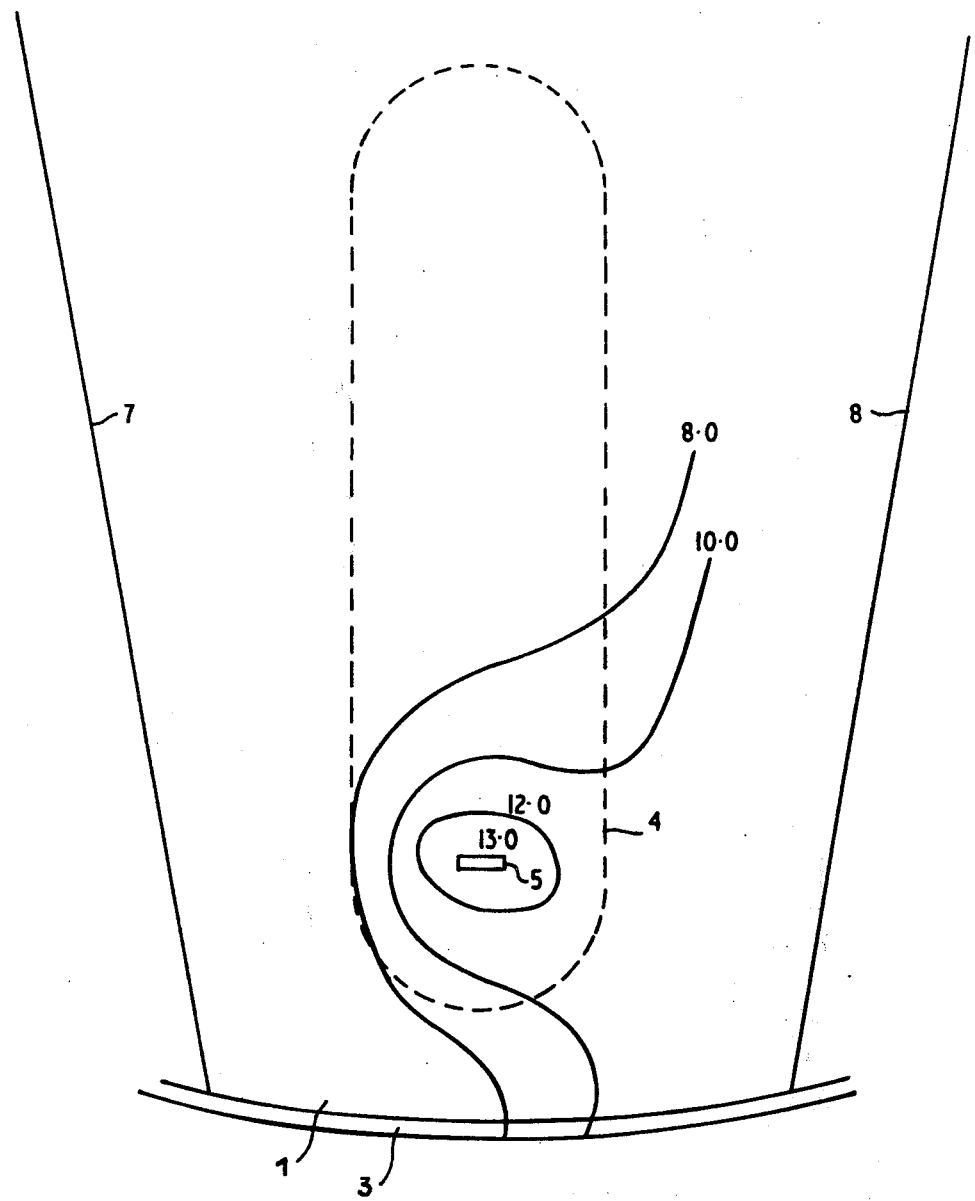

The use of a backing plate 3 bent as described above is entirely satisfactory. The flexible disk 1 flies with good stability and reliable recording and playback of data signals was achieved. The effect of the bends on the flying height of the disk 1 relative to the backing plate 3 is illustrated in FIS. 6, 7 and 8 which show the head 5 in three different positions, respectively. In FIG. 6 the head 5 is located at its innermost radial extremity towards the disk spindle 2; in FIG. 7 the head is at its radial mid-position; and in FIG. 8 it is shown at the outermost radial extremity towards the periphery of the disk. The disk is the same as that which produced the contours shown in FIG. 3 when flying over a flat plate 3 but was clamped slightly lower, at the height of 8 mils above the backing plate 3. It was rotated at the same speed of 1500 rpm. The results using the bent backing plate shown in FIGS. 6, 7 and 8 show a considerable improvement over the flat plate shown in FIG. 3. In all cases, it is seen that the disk 1 tenting is confined to a very small area and the head 5 gap (not shown) is located in the center of a substantially circular contour line. It should be pointed out that although the bends 7 and 8 in the FIGURES are shown as thin lines, in practice they do have a radius. A most important advantage of the inventive plate over the flat backing plate is not apparent from the diagrams. Whereas a disk 1 flying over a flat backing plate 3 is continuously fluttering, the same disk 1 flying over a backing plate 3 bent as described above is quite stable even though some of the tenting contour lines intersect the disk periphery.

Figure 9:
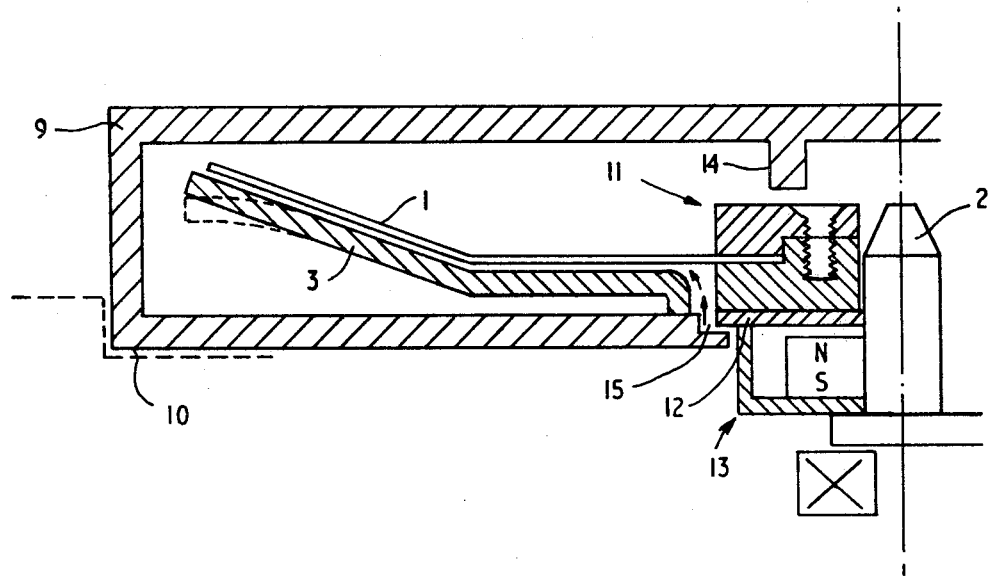
FIG. 9 shows a part secton of a cartridge containing a flexible disk flying over a backing plate according to the invention.

FIG. 9 shows a bent backing plate 3 and flexible disk 1 housed in a cartridge 9 which is detachable from a spindle 2 of a drive unit 10. The backing plate 3 is fixedly mounted within the cartridge or alternatively it may itself be used as the base of cartridge 9. The cartridge 9 may consist of a cover with a removable base (not shown). When the base is removed, the cover type cartridge is then placed over a bent back plate. Precision locations of any suitable design may be employed to insure concentricity between disk 1 and spindle 2. The disk hub 11 can include an annular steel ring 12 which when in use on a drive cooperates with a magnetic chuck 13 attached to the drive spindle 2. An annular projection 14 and shoulder 15 within the cartridge 9 restrain the movement of the disk hub 11 within the cartridge when not installed on a drive unit 10. Although the edge portions of the backing plate are preferably flat for the reasons previously given, a slight downward bend may be given to them as shown in dotted outline in FIG. 9 in order to reduce the depth of the cartridge.

Finally the data storage apparatus of the present invention may be operated while mounted in any plane, including upside down. With some disk materials there is a tendency for the disk to cling to the backing plate during start-up. This problem, if it exists, is readily solved by providing the backing plate with a slightly roughened surface, for example by sand blasting, so that small pockets of air are trapped between the stationary disk and the backing plate.

While the invention has been particularly shown and described with reference to preferred embodiments thereof, it will be understood by those skilled in the art that various changes in form and details may be made therein without departing from the spirit and scope of the invention.

What is claimed is:

1. A flexible record disk type signal storage apparatus including in combination:
    a backing member having a flat web portion in a first axial plane and other portions abutting said web portion disposed in planes on opposite sides of and in other than said axial plane such that a generally concave surface faces a first direction,
    a flexible signal record disk mounted in juxtaposition to said concave facing surface for rotation thereover about an axis of rotation and in a path conforming to said backing member, and
    transducing means located in juxtaposition to said web portion and adapted for radial motions for transducing operations with respect to said signal record disk.

2. The flexible record disk signal storage apparatus set forth in claim 1 wherein said web portion has circumferential extents which are terminated along a pair of chordal lines, respectively on opposite circumferential extremeties thereof and said web portion extending radially from a periphery of said record storage disk to said axis of rotation.

3. The flexible record disk signal storage apparatus set forth in claim 2 wherein said web portion extends entirely along one diameter of said record disk and said circumferential extremeties lying along a pair of chordal lines of said signal record storage disk, and
    said other portions lying entirely in planes other than said one axial plane such that a single concave or channel shaped face of said plate faces said record storage disk.

4. The flexible record disk signal storage apparatus set forth in claim 3 wherein said other portions comprise a pair of facing planar portions extending at an acute angle when measured from said first axial plane subtending an angle opening away from said web portion.

5. The flexible record disk signal storage apparatus set forth in claim 4 wherein said plate is a relatively thin plate bent along said two chordal lines to produce said flat web portion and said two planar portions.

6. The flexible record disk signal storage apparatus set forth in claim 4 wherein the circumferential extent of said web portion adjacent said transducing location is less than the circumferential extent of said web portion on an opposite diametrical end of said web portion.

7. The flexible record disk signal storage apparatus set forth in claim 6,
    a shaft having a radially enlarged hub supporting said record disk for rotation over said backing plate and wherein said web portion has a circumferential extent to accommodate both said radially enlarged hub and said transducer location such that both said radially enlarged hub and transducer locaton are circumscribed by said web portion.

8. The flexible record disk signal storage apparatus set forth in claim 4 in which the circumferential extremeties of said web portion lie along two chordal lines intersecting beyond the peripheral extent of said record storage disk radially outwardly of said transducing location such that the circumferential extent of said web portion adjacent said transducing location is less than the circumferential extent of said web portion on a diameter radially opposite said transducing location.

9. The flexible record disk signal storage apparatus set forth in claim 8 wherein said other portions are mirror images of each other and such that said web portion is symmetrically disposed with respect to said transducing location.

10. The flexible record disk signal storage apparatus set forth in claim 4 wherein said web portion has a radially elongated closed slot disposed coextensively with said transducing location, and
    said transducer being radially movably disposed within said slot including a transducing portion facing said record storage disk.

11. A flexible record disk signal storage apparatus set forth in claim 10 wherein said transducer extends axially from said web portion toward said record storage disk.

12. The flexible record disk signal storage apparatus set forth in claim 4 wherein the radial extent of said plate is greater than the radial extent of said record storage disk and said transducing location is disposed radially inwardly of said record storage disk.

13. The flexible record disk signal storage apparatus set forth in claim 1 further including a cartridge, said flexible disk being disposed within said cartridge, and means for imparting rotation of said flexible disk within said cartridge when mounted adjacent said backing plate.

14. The flexible record disk signal storage apparatus set forth in claim 1 wherein said backing plate web portion extends entirely along one diameter of said disk and said other portions being flat planar portions subtending an angle with respect to said first axial plane and opening away from said web portion at an angle of between eight and twenty degrees.

15. The flexible record disk signal storage apparatus set forth in claim 14 wherein said angle subtended lies in the range of ten degrees to eighteen degrees.

16. The flexible record disk signal storage apparatus set forth in claim 15 wherein said angle subtended by both of said other portions are equal and the lines joining said other portions to said web portions being symmetrically disposed with respect to said transducing location.

17. The flexible disk signal storage apparatus set forth in claim 16 wherein said web portion has a radially elongated slot coextensive with said tranducing location, and a transducer movably mounted within said slot and extending from said plate toward said disk from said first axial plane for transducing operations with said disk.

18. The method of stabilizing a flexible disk for facilitating transducing operations in a recorder and said flexible disk adapted for rotation about an axis of rotation, the steps of:
during risk rotation shaping said record disk in a somewhat concave shape including inducing a flat portion in first axial plane adjacent a desired transducing location by rotating said disk adjacent a plate circumscribing said transducing location and located to one side of said disk and said plate having a radial extent from one periphery of said disk at least to said axis of rotation and applying stabilizing fluid forces in planes on opposite sides of and said disk in planes other than said first axial plane whereby said other portions are moved to said planes other than said flat plane.

19. The method set forth in claim 18 further including the step of shaping said record storage disk by applying said stabilizing forces to bend said disk along a pair of chordal lines extending entirely across said record storage disk whereby the storage disk is divided into said flat portion abutted by two other portions extending at an angle with respect to said flat portion.

20. The method of claim 19 further including the step of making all three of said portions relatively flat.

21. The method set forth in claim 19 further including the step of extending a transducer to said disk along said desired transducing location from said one side such that a tent is formed in said flat portion.

22. A flexible disk record storage apparatus comprising a backing plate,
a flexible record storage disk disposed on one side of said backing plate for rotation thereover and about an axis of rotation,
means for rotatably supporting and means rotating said flexible record storage disk,
said record storage disk having a given diameter,
said backing plate having a flat web portion extending along a diameter of said record storage disk along a plane substantially perpendicular to the axis of rotation of said disk,
a pair of other portions of said backing plate abutting said web portion at a predetermined angle along a pair of chordal lines respectively,
said web portion having a radially elongated slot extending from adjacent a peripheral edge of said disk toward said axis of rotation,
a transducer mounted for radial motions in said slot and extending toward said disk from said web portion,
means for mounting said transducer for said radial motions, and
said chordal lines subtending an acute angle opening from said slot toward said axis of rotation and means including means for inducing air flow intermediate said disk and said backing plate.

23. For use in a flexible record disk type signal storage apparatus, including in combination:
a backing member having a flat web portion in a first axial plane and other portions abutting said web portion disposed in planes on opposite sides of and in other than said first axial plane such that a generally concave surface faces a first direction, and
a flexible signal record disk mounted in juxtaposition to said concave facing surface for rotation thereover about an axis of rotation which intersects said first axial plane and in a path conforming to said backing member.

24. The apparatus set forth in claim 23 wherein said web portion has circumferential extents which are terminated along a pair of chordal lines, respectively on opposite circumferential extremeties thereof and said web portion extending radially from a periphery of said record storage disk to said axis of rotation.

25. The apparatus set forth in claim 24 further including a cover over said backing member for enclosing said flexible record disk.

26. The apparatus set forth in claim 25 wherein said backing member is a bottom wall.

27. The apparatus set forth in claim 25 wherein said first web portion includes an aperture for receiving a transducer for transducing operations with respect to said flexible signal record disk.

28. Apparatus for use in a flexible record disk type signal storage apparatus, including in combination:
a backing member having a flat web portion in a first axial plane and another potion abutting said web portion along a straight line lying in said axial plane, said other portion being disposed in a plane on one side of and at an acute angle to said first axial plane such that a generally concave surface faces a first direction, and
a flexible signal record disk mounted in juxtaposition to said concave facing surface for rotation thereover about an axis of rotation which intersects said first axial plane and in a path conforming to said backing member.

29. Apparatus set forth in claim 28 wherein said other portion is planar and disposed at an angle of not less than 2° with respect to said flat web portion.

30. Apparatus set forth in claim 28 wherein said other portion and sad flat web portion are joined in a straight line along a chordal line, said flexible signal record disk and said chordal line being disposed at an angle in said first axial plane with respect to a radial line of said record storage disk.

31. Apparatus set forth in claim 30 wherein said flat web portion has a radially-elongated aperture for receiving a radially-movable transducer and being juxtaposed to said other portion.

* * * * *